United States Patent
Ravid et al.

(10) Patent No.: US 8,014,004 B2
(45) Date of Patent: *Sep. 6, 2011

(54) DETERMINING PHYSICAL PROPERTY OF SUBSTRATE

(75) Inventors: Abraham Ravid, Cupertino, CA (US); Boguslaw A. Swedek, Cupertino, CA (US); Jeffrey Drue David, San Jose, CA (US); Jun Qian, Sunnyvale, CA (US); Ingemar Carlsson, Milpitas, CA (US); Dominic J. Benvegnu, La Honda, CA (US); Harry Q. Lee, Los Altos, CA (US); Lakshmanan Karuppiah, San Jose, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/822,096

(22) Filed: Jun. 23, 2010

(65) Prior Publication Data

US 2010/0261413 A1 Oct. 14, 2010

Related U.S. Application Data

(63) Continuation of application No. 12/253,160, filed on Oct. 16, 2008, now Pat. No. 7,746,485, which is a continuation of application No. 11/611,640, filed on Dec. 15, 2006, now Pat. No. 7,444,198.

(51) Int. Cl.
*G01B 11/28* (2006.01)
(52) U.S. Cl. ............... 356/630; 700/117; 702/172
(58) Field of Classification Search .......... 356/630; 700/117; 702/172
See application file for complete search history.

(56) References Cited

U.S. PATENT DOCUMENTS

| | | |
|---|---|---|
| 5,365,340 A | 11/1994 | Ledger |
| 5,436,725 A | 7/1995 | Ledger |
| 5,893,796 A | 4/1999 | Birang et al. |
| 5,900,633 A | 5/1999 | Solomon et al. |
| 6,093,081 A | 7/2000 | Nyui et al. |
| 6,108,091 A | 8/2000 | Pecen et al. |
| 6,153,116 A | 11/2000 | Yang et al. |
| 6,172,756 B1 | 1/2001 | Chalmers et al. |
| 6,184,985 B1 | 2/2001 | Chalmers et al. |
| 6,190,234 B1 | 2/2001 | Swedek et al. |
| 6,204,922 B1 | 3/2001 | Chalmers |

(Continued)

FOREIGN PATENT DOCUMENTS

EP 0660076 6/1995

(Continued)

*Primary Examiner* — Tarifur Chowdhury
*Assistant Examiner* — Isiaka O Akanbi
(74) *Attorney, Agent, or Firm* — Fish & Richardson P.C.

(57) ABSTRACT

A method of determining a physical property of a substrate includes recording a first spectrum obtained from a substrate, the first spectrum being obtained during a polishing process that alters a physical property of the substrate. The method includes identifying, in a database, at least one of several previously recorded spectra that is similar to the recorded first spectrum. Each of the spectra in the database has a physical property value associated therewith. The method includes generating a signal indicating that a first value of the physical property is associated with the first spectrum, the first value being determined using the physical property value associated with the identified previously recorded spectrum in the database. A system for determining a physical property of a substrate includes a polishing machine, an endpoint determining module, and a database.

20 Claims, 7 Drawing Sheets

U.S. PATENT DOCUMENTS

| | | | |
|---|---|---|---|
| 6,270,622 | B1 | 8/2001 | Klippert et al. |
| 6,271,047 | B1 | 8/2001 | Ushio et al. |
| 6,296,548 | B1 | 10/2001 | Wiswesser et al. |
| 6,361,646 | B1 | 3/2002 | Bibby, Jr. et al. |
| 6,573,999 | B1 | 6/2003 | Yang Feng |
| 6,618,130 | B2 | 9/2003 | Chen |
| 6,623,991 | B2 | 9/2003 | Johnson et al. |
| 6,670,200 | B2 | 12/2003 | Ushio et al. |
| 6,676,482 | B2 | 1/2004 | Bibby, Jr. et al. |
| 6,678,046 | B2 | 1/2004 | Opsal |
| 6,678,055 | B2 | 1/2004 | Du-Nour et al. |
| 6,679,756 | B2 | 1/2004 | Ishikawa et al. |
| 6,762,838 | B2 | 7/2004 | DuNour |
| 6,768,967 | B2 | 7/2004 | Johnson et al. |
| 6,801,321 | B1 | 10/2004 | Du-Nour |
| 6,806,105 | B2 | 10/2004 | Johnson et al. |
| 6,806,948 | B2 | 10/2004 | Katz et al. |
| 6,813,034 | B2 | 11/2004 | Rosencwaig et al. |
| 6,819,426 | B2 | 11/2004 | Sezginer et al. |
| 6,836,328 | B2 | 12/2004 | Opsal |
| 6,842,259 | B2 | 1/2005 | Rosencwaig et al. |
| 6,885,467 | B2 | 4/2005 | Du-Nour et al. |
| 6,898,596 | B2 | 5/2005 | Aikens et al. |
| 6,908,374 | B2 | 6/2005 | Wang et al. |
| 6,912,056 | B2 | 6/2005 | Hyun et al. |
| 6,942,546 | B2 | 9/2005 | Desai et al. |
| 6,947,135 | B2 | 9/2005 | Johnson |
| 6,963,407 | B2 | 11/2005 | Abe et al. |
| 6,995,842 | B2 | 2/2006 | Opsal |
| 7,057,744 | B2 | 6/2006 | Nomoto et al. |
| 7,119,908 | B2 | 10/2006 | Nomoto et al. |
| 7,120,553 | B2 | 10/2006 | Benvegnu |
| 7,300,332 | B2 | 11/2007 | Kobayashi et al. |
| 7,324,210 | B2 | 1/2008 | De Groot et al. |
| 7,375,828 | B1 | 5/2008 | Aoyagi et al. |
| 7,444,198 | B2 * | 10/2008 | Ravid et al. .................... 700/117 |
| 7,460,237 | B1 | 12/2008 | Cramer |
| 7,487,053 | B2 | 2/2009 | Funk et al. |
| 7,746,485 | B2 * | 6/2010 | Ravid et al. .................... 356/630 |
| 7,822,500 | B2 * | 10/2010 | Kobayashi et al. ............ 700/108 |
| 2002/0005957 | A1 | 1/2002 | Finarov et al. |
| 2002/0030826 | A1 | 3/2002 | Chalmers et al. |
| 2003/0210408 | A1 | 11/2003 | Jun et al. |
| 2004/0042017 | A1 | 3/2004 | Cohen et al. |
| 2004/0080757 | A1 | 4/2004 | Stanke et al. |
| 2004/0087041 | A1 | 5/2004 | Perry et al. |
| 2004/0263868 | A1 | 12/2004 | Isei et al. |
| 2005/0037615 | A1 | 2/2005 | Cabib et al. |
| 2005/0148104 | A1 | 7/2005 | Kota et al. |
| 2007/0042681 | A1 | 2/2007 | Benvegnu et al. |
| 2007/0252963 | A1 | 11/2007 | Modderman et al. |
| 2008/0239308 | A1 | 10/2008 | Ravid et al. |
| 2008/0243433 | A1 | 10/2008 | Ravid et al. |

FOREIGN PATENT DOCUMENTS

| | | |
|---|---|---|
| EP | 1176631 | 1/2002 |
| JP | 2000-183001 | 6/2000 |
| JP | 2000-310512 | 11/2000 |
| JP | 2001-287159 | 10/2001 |
| JP | 2002-359217 | 12/2002 |
| JP | 2005-159203 | 6/2005 |
| WO | WO 00/54935 | 9/2000 |
| WO | WO 01/72470 | 10/2001 |
| WO | WO 2004/035265 | 4/2004 |

* cited by examiner

DETERMINING PHYSICAL PROPERTY OF SUBSTRATE

CROSS-REFERENCE TO RELATED APPLICATION

This application is a continuation of U.S. application Ser. No. 12/253,160, filed Oct. 16, 2008, which is a continuation of U.S. application Ser. No. 11/611,640, filed Dec. 15, 2006, now U.S. Pat. No. 7,444,198. The disclosure of the prior applications is considered part of (and is incorporated by reference in) the disclosure of this application.

TECHNICAL FIELD

This description relates to determining a physical property of a substrate during a polishing process.

BACKGROUND

There are many situations in which light rays can be used for determining a physical characteristic of a material. For example, it is sometimes desirable to measure the thickness of a layer that is deposited on top of a substrate. That is, when a layer on top of a substrate is being planarized or otherwise partially removed in a polishing process, one may want to determine (directly or indirectly) the remaining thickness so that too much material is not removed. As another example, when a layer is being deposited on a substrate, one may want to determine (directly or indirectly) the deposited thickness so that too much or too little of the layer material is not deposited. It can also be important to determine uniformity of the layer thickness. Thus, the purpose of determining the thickness in some situations may be to determine a desired end point of a manufacturing process or what pressure profile to use across the wafer, and/or a polish time to use for the wafer. In other examples, a physical characteristic such as thickness may be determined for quality control, classification, calibration, compatibility testing, or other purposes.

Chemical mechanical polishing (CMP) is one example of a manufacturing process in which end point determination or real-time thickness monitoring is performed. For example, CMP is sometimes performed on a wafer or other substrate that includes integrated circuits. An integrated circuit is typically formed on a substrate by the sequential deposition of conductive, semiconductive or isolative layers on a silicon wafer. After each layer is deposited, the layer is etched to create circuitry features. As a series of layers are sequentially deposited and etched, the outer or uppermost surface of the substrate, i.e., the exposed surface of the substrate, becomes increasingly non-planar. This non-planar surface presents problems in the photolithographic steps of the integrated circuit fabrication process or the electrical properties of the contact lines or the devices. The deposited layers must be planarized and then polished down to a specified thickness.

CMP is one accepted method of planarization. This planarization method typically requires that the substrate be mounted on a carrier or polishing head. The exposed surface of the substrate is placed against a rotating polishing pad, or a pad that is an axially moving sheet. The polishing pad may be either a "standard" pad or a fixed-abrasive pad. A standard pad has a durable roughened surface, whereas a fixed-abrasive pad has abrasive particles held in a containment media. The carrier head provides a controllable load profile, i.e., pressure, on the substrate to push it against the polishing pad. A polishing slurry, including at least one chemically-reactive agent, and abrasive particles if a standard pad is used, is supplied to the surface of the polishing pad.

The effectiveness of a CMP process may be measured by its polishing rate, and by the resulting finish (absence of small-scale roughness) and flatness (absence of large-scale topography) of the substrate surface. The polishing rate, finish and flatness are determined by many factors, including the pad and slurry combination, the carrier head configuration, the relative speed between the substrate and pad, and the force pressing the substrate against the pad.

In order to determine the effectiveness of different polishing tools and processes, a so-called "blank" wafer, i.e., a wafer with multiple layers but no pattern, may be polished in a tool/process qualification step. After polishing, the remaining layer thickness may be measured at several points on the substrate surface. The variation in layer thickness provides a measure of the wafer surface uniformity, and a measure of the relative polishing rates in different regions of the substrate. One approach to determining the substrate layer thickness and polishing uniformity is to remove the substrate from the polishing apparatus and examine it. For example, the substrate may be transferred to a metrology station where the thickness of the substrate layer is measured, e.g., with an ellipsometer. This process can be time-consuming and thus costly, and the metrology equipment is costly.

One challenge in CMP is determining whether the polishing process is complete or uniform, i.e., whether a substrate layer has been uniformly planarized to a desired flatness or thickness. Many different factors can cause variations in the material removal rate, including variations in the initial thickness of the substrate layer and its properties, the slurry composition, the polishing pad condition, the relative speed between the polishing pad and the substrate, and the load on the substrate. These variations in turn cause variations in the time needed to reach the desired thickness and uniformity. Therefore, these and other properties cannot be determined merely as a function of polishing time.

SUMMARY

The invention relates to determining a physical property of a substrate. For example, it is described that a database can be created from spectra measured from substrates, the spectra having been associated with corresponding values for one or more physical properties. By comparing a currently measured spectrum with the database, a value for the physical property can be determined.

In a first general aspect, a method of determining a physical property of a substrate includes recording a first spectrum obtained from a substrate, the first spectrum being obtained during a polishing process that alters a physical property of the substrate. The method includes identifying, in a database, at least one of several previously recorded spectra that is similar to the recorded first spectrum. Each of the spectra in the database has a physical property value associated therewith. The method includes generating a signal indicating that a first value of the physical property is associated with the first spectrum, the first value being determined using the physical property value associated with the identified previously recorded spectrum in the database.

Implementations can include any or all of the following features. Multiple spectra can be identified in the database as being similar to the recorded first spectrum. The method can further include processing the physical property values associated with the multiple identified spectra to determine the first value.

The physical property can be one selected from the group consisting of: a layer thickness on the substrate and a step height on the substrate. The physical property can be one that is determined using a non-optical method. The method can further include establishing the database before the steps of recording, identifying and assigning are performed. Establishing the database can include performing a first measurement of a physical property of the substrate specimen before it is polished, the physical property being measured in several predefined zones on the substrate specimen. Establishing the database can include: polishing the substrate specimen after measuring the thickness, the polishing being done in several rotations; and collecting spectra from the substrate specimen while it is being polished. Establishing the database can include performing a second measurement of the physical property of the substrate specimen in the several predefined zones after it is polished. The method can further include assigning, in the database, the first measured physical property to a spectrum that was the first one to be collected during polishing, and assigning the second measured physical property to a spectrum that was the last one collected. The method can further include determining interpolation values for the physical property using the first and second measured thicknesses and assigning the interpolation values to intermediate spectra. The interpolation values can be determined by adapting a mathematical curve to correlated measurements of the physical property.

In a second general aspect, a system for determining a physical property of a substrate includes a polishing machine for performing a polishing process that alters a physical property of the substrate of a substrate. The system further includes a module for recording at least a first spectrum obtained from the substrate during the polishing process. The system further includes a database having stored therein multiple spectra, each associated with a value of the physical property, wherein at least one spectrum in the database that is similar to the first spectrum is identified, and the endpoint determining module receives a value determined using the physical property value associated with the identified spectrum.

Implementations can include any or all of the following features. A database management module can perform the identification and forward the associated value to the endpoint determining module. The database management module can further be used in establishing the database by collecting the spectra and associating them with the respective physical-property values. An automated process control module can control the polishing machine using a preselected value obtained from the database before the polishing process, the preselected value obtained through a pre-polish measurement of the substrate. A metrology tool can determine the physical property values before they are associated with the respective spectra in the database.

BRIEF DESCRIPTION OF DRAWINGS

Like reference symbols in the various drawings indicate like elements.

DETAILED DESCRIPTION

Figure 1:
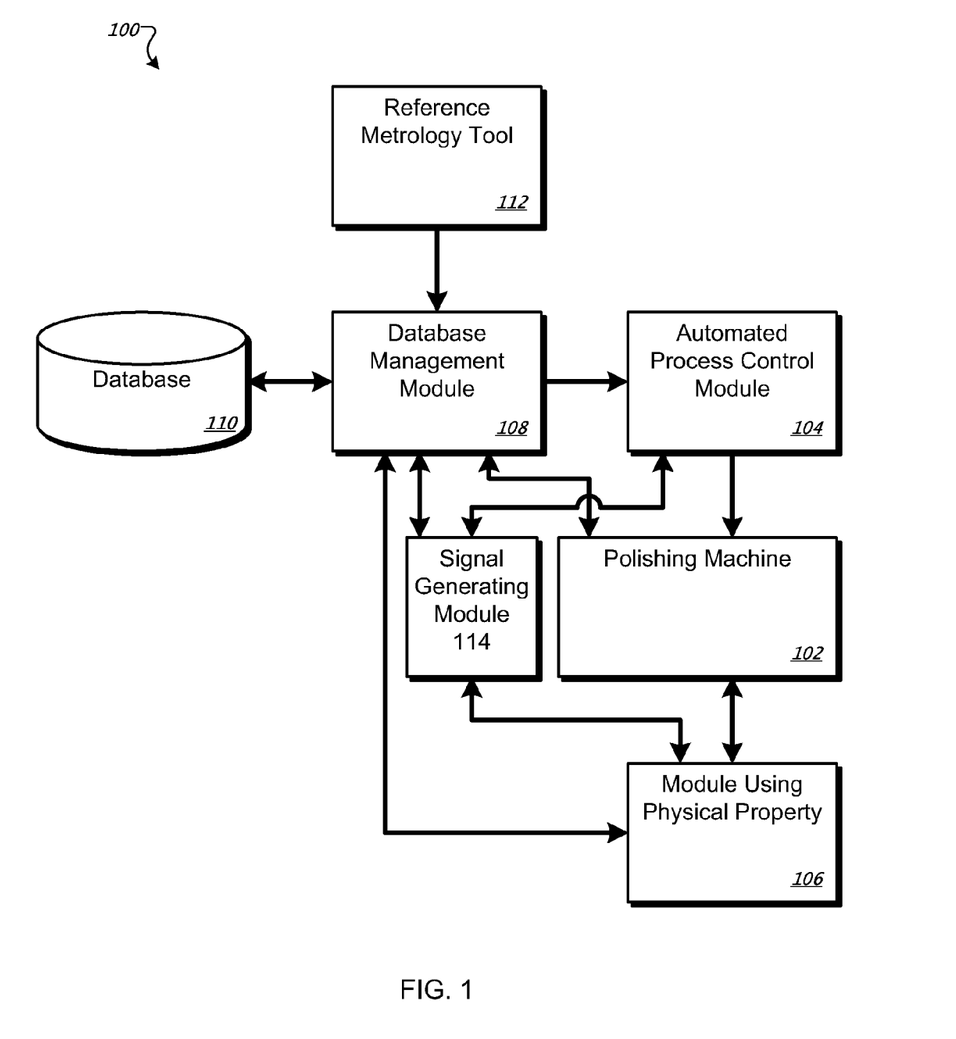
FIG. 1 is a block diagram of an example system for determining a physical property of a substrate.

FIG. 1 is a block diagram of an example system for determining a physical property of a patterned substrate before, during, and/or after polishing. For example, the substrate may be a wafer that includes integrated circuitry. Particularly, the patterned substrate may include active regions and trench regions, which are well-known in the area of semiconductor manufacturing. As is also well-known, the substrate may be covered by an oxide layer or another dielectric layer that covers both the active regions and the trench regions. The apparatus can be used for determining a thickness of a layer on a substrate, for example an oxide layer, by recording a spectrum from the substrate being polished and finding one or more matching spectra in a database of previously measured spectra.

A polishing machine 102 polishes the substrate using conventional polishing techniques. An automated process control module 104 controls the polishing machine 102 to start the polishing and may define parameters for the process. Alternatively, a process other than polishing may be performed, such as deposition (e.g., chemical vapor deposition), removal processes (e.g., wet and dry etching), or patterning (e.g., lithography).

The system includes a module using physical property 106 that will use a physical property determined for the substrate. In one implementation, the module 106 records a spectrum reflected from the substrate and matches that spectrum with previously recorded spectra in a database. The module using physical property 106 may include, for example, a light source and a spectrum recorder. In one implementation, the module using physical property 106 can be configured to interrupt or otherwise alter the polishing process (or other process) when the substrate reaches a certain value of a physical property. In another implementation, the spectrum can be obtained from the substrate in another way, for example by being transmitted through the substrate.

A database management module 108 receives a spectrum recorded by the module using physical property 106. If the spectrum is recorded during a setup process for a database 110, the module 108 can record the spectrum in the database 110, where it can then be used for determining one or more physical properties for a substrate. In one implementation, and particularly after receiving a spectrum as part of a property-determining operation, the module 108 compares that spectrum with previously recorded spectra that have physical property values associated with them, selects a matching one of the spectra, and generates a signal indicating the identified physical property value. The database management module 108 retrieves the identified physical property value from the database 110.

The database 110 stores previously recorded spectra reflected from one or more substrates in connection with one or more previous processes. In addition, the database 110 stores measured physical property values associated with the recorded spectra. A reference metrology tool 112 measures the physical property values to be associated with the previously recorded spectra. For example, a spectrum recorded before (or at the beginning of) polishing is associated with a physical property measurement made before polishing and a spectrum recorded after (or at the end of) polishing is associated with a physical property measurement made after polishing. Physical property values corresponding to spectra with characteristics between those of the beginning spectrum and the end spectrum may be extrapolated between the beginning physical property value and the end physical property value.

The database management module 108 identifies one or more previously recorded spectra that are similar to the spectrum recorded by the module using physical property 106 and generates a signal that indicates the physical property value associated with the similar spectra. Alternatively, a physical property value may be extrapolated based on the similar spectrum, the recorded spectra, and the physical property value associated with the similar spectra. The signal including the physical property value may be forwarded to the module using physical property 106 or the automated process control module 104 and used to control the polishing machine 102.

In another implementation, the signal is generated by a separate signal generating module 114. This module can receive an instruction from the database management module as to what value is to be output. In response to receiving that communication, the module 114 can generate a signal that identifies the value and indicates that it is associated with the obtained spectrum. For example, the module 114 can generate such a signal for receipt by the module using physical property 106 or by the automated process control module 104.

For example, the measured physical property may be a step height of structures on the surface of the substrate and may be provided by a profilometer, such as a high resolution profiler (HRP). In addition, the recorded spectra may indicate by optical interferometry a thickness of a borophosphosilicate glass (BPSG) layer of the substrate. The spectrum reflected by the BPSG during the polishing process is matched with a similar spectrum previously recorded to determine a previously measured HRP step height. Reflected spectra may be repeatedly matched to various ones of previously recorded spectra until a desired HRP step height is achieved from the polishing process. After the database 110 of spectra and physical property values is established, profilometer measurements may be provided without the presence of a profilometer during the polishing process. In addition, multiple spectra may be recorded that correspond to multiple zones of the substrate. The recorded spectra may be used to determine multiple physical property values associated with the multiple zones. The multiple values may be of a common property or of two or more different properties. For example, any physical property that is manifested in a spectrum generated from a substrate can be determined.

When multiple spectra are identified in the database as being similar to the spectrum obtained from the substrate, their corresponding physical-property values can be processed to generate the sought value. For example, the system can calculate the average of the values associated with the identified spectra. As another example, the values can be statistically processed to determine a representative value, such as with a least squares method or by eliminating extreme maxima or minima among the values.

Figure 2:
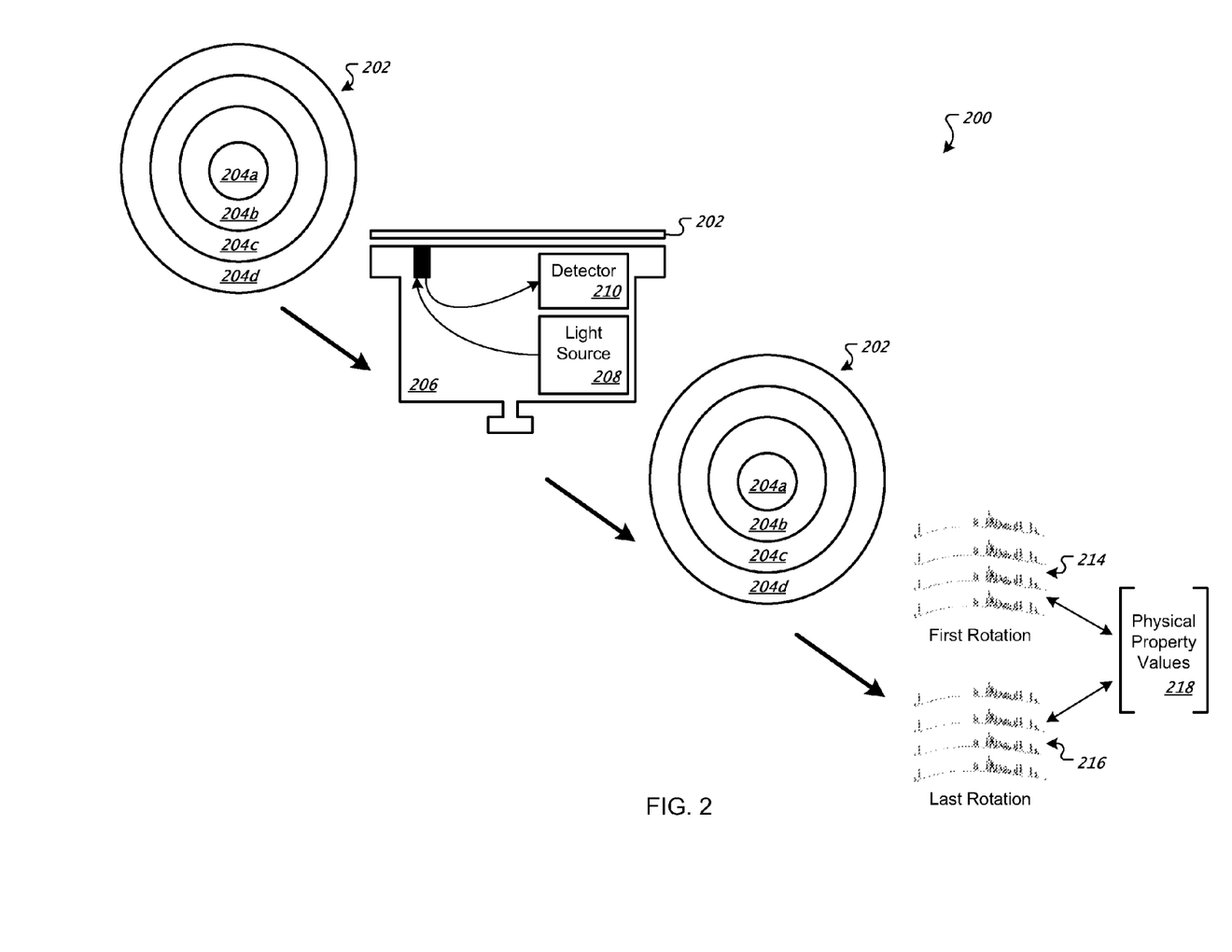
FIG. 2 is a schematic diagram of an example system for establishing a database of measured spectra associated with physical property values of a substrate.

FIG. 2 shows a schematic diagram of an example system 200 for generating the database by identifying one or more physical property values associated with multiple zones 204*a-d* of a substrate 202. A physical property measurement is made for each of the zones 204*a-d*, such as step heights of the zones 204*a-d* before a polishing begins. In certain implementations, another physical property may be measured. Moreover, multiple measurements can be made for a single zones, and these measurements can then be used in determining the property value. For example, the value can be determined as an average of all the taken measurements for the zone. As another example, this processing can take into account a distribution of the values and the average can be skewed accordingly. In each of the implementations, a large number of values may be taken in an attempt to pick up a variance in the measured variable on the wafer.

A polishing apparatus 206 polishes the substrate 202. The apparatus 206 includes a light source 208 for producing a light beam to impinge on the substrate 202, and a detector 210 for receiving light that is reflected off the substrate 202. For example, the light source 208 may be a light bulb that produces white light, such as light that is essentially within the ultraviolet (UV) to infrared (IR) wavelength range. In selected embodiments, a wavelength range of 2000-15000 Angstrom (A) may be used. In some implementations, the light source 208 is a Tungsten, Xenon, or Mercury lamp. Optionally, light source 208 includes fiber optics for guiding the produced light beam onto the substrate 202. The detector 210 may be a spectro-photometer that measures reflectance from the patterned substrate 202. The detector can have several elements, and each such element can be dedicated to a different wavelength range. In some implementations, the detector 210 includes an array of silicon diodes as is well-known. The detector 210 is capable of measuring reflectance over a range of wavelengths.

A reflected light beam emerges from the substrate 202 as a result of the incident light beam. The reflected light is preferably detected separately for the various zones 204*a-d*. The reflected light beam, as is well-known, consists of light that is reflected from several different layers in the substrate 202. That is, when the substrate 202 consists of several layers with different refractions indices, each boundary between layers may give rise to a light reflection that contributes to the overall reflected light beam.

The detector 210 detects the reflected light beam and transmits the detected spectrum to a computer that may also control the light source 208. The detector 210 may detect reflectances from the substrate 202 over a wavelength interval, for example, 2500-8000 A. For example, the detector 210 transmits information to the computer that can be graphically displayed as a reflectance spectrum over the registered wavelength range.

The reflected light beam for each of the regions 204*a-d* is detected by detector 210 and corresponding spectra are transmitted to the computer. These measured reflectances can be used to build a database of measured spectra and associated physical characteristics for the patterned substrate 202.

The substrate 202 is measured again after the polishing process to obtain new step heights (or another physical property) of the zones 204*a-d*. These pre-polishing and post-polishing measurements will be used in generating the database. Spectra 214 taken during a first rotation of the polishing apparatus 206 and spectra 216 taken during a last rotation of the polishing apparatus 206 are associated with physical property values 218 measured before and after the polishing, respectively. In certain implementations, this establishes a database of spectra and associated physical property values that may be used to identify physical property values of subsequent similar substrates during polishing processes.

Figure 3:
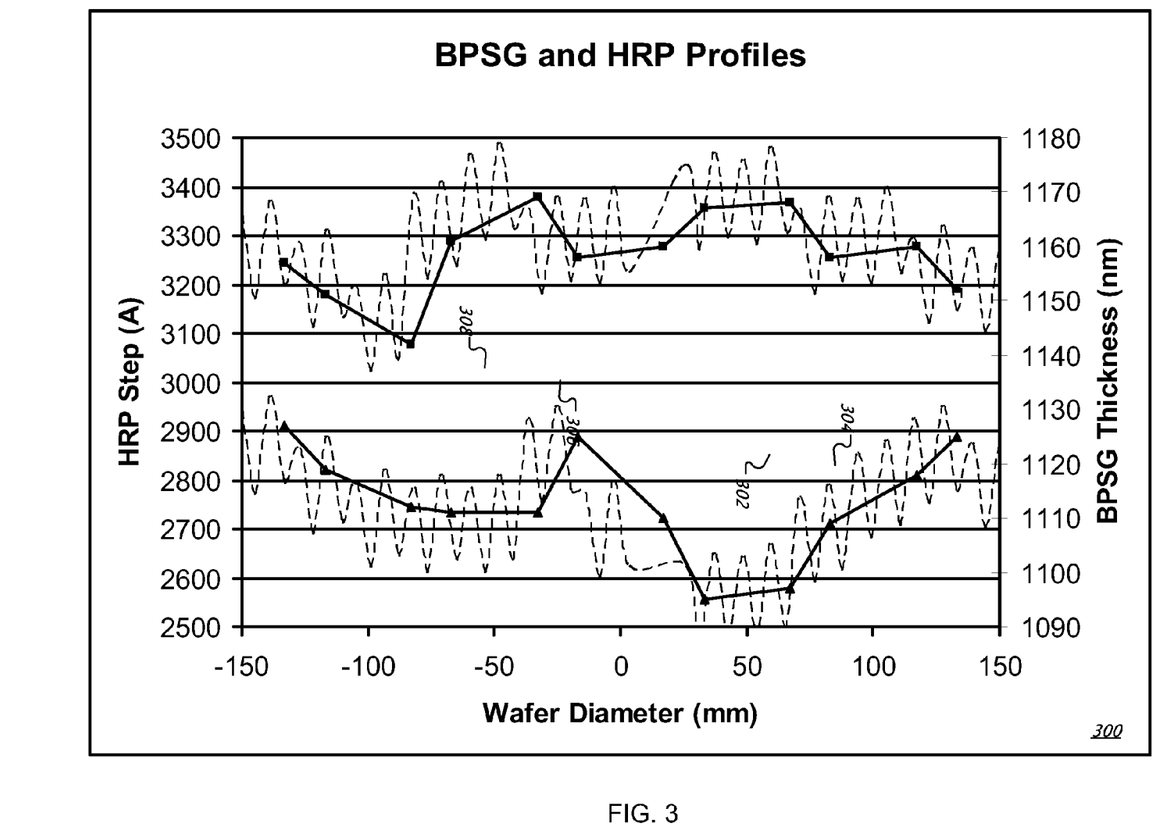
FIG. 3 is an example graph of two physical properties versus wafer diameter.

FIG. 3 shows an example graph 300 of step height and thickness versus wafer diameter. Here, wafer diameter, shown on the horizontal axis, is measured in millimeters from the center of the substrate in a positive and a negative direction. The step height physical property is measured in Angstroms and is shown on the left vertical axis. The thickness is measured in nanometers and is shown on the right vertical axis. Line 302 in the graph represents a height physical property of a substrate as measured by an HRP metrology tool. For example, this tool can be included in the reference metrology tool 112 (FIG. 1). Particularly, each of the discrete data points shown in the line 302 here corresponds to a measurement done with the tool, and the remainder of the line represents an interpolation between these points. Line 304, in turn, is a height as determined by matching spectra recorded from the substrate with previously recorded spectra having associated height measurements. These previously recorded spectra and their associated physical characteristic values (here, thicknesses) can be stored in the database 110 (FIG. 1). The matching of spectra from the current substrate with previously recorded spectra allow height measurements to be determined for the recorded spectra as shown by the line 304.

More than one physical property of the substrate can be determined using the spectra recorded from the substrate. For example, a layer thickness can be determined in addition to, or in lieu of, the step height as will now be described. Line 306 is a thickness physical property as determined by an optical thickness metrology tool. Similarly to the above description, the data points can be determined by the optical thickness metrology tool and this tool can be included in the metrology tool 112 (FIG. 1). Line 308 is a thickness as determined by matching spectra recorded from the substrate with previously recorded spectra having associated thickness measurements. The matching of spectra from the current substrate with previously recorded spectra allow thickness values to be determined for the recorded spectra as shown by the line 308. Particularly, the spectra used in determining the line 304 can be used for determining the line 308. Also, each of the previously recorded spectra can have property values for multiple types of properties associated therewith. For example, assume that each of the individual step height values that makes up the line 304 is identified by a match with a separate spectrum in the database 110 (FIG. 1). Each of these separate spectra in the database can also have thickness values associated with it, and these thickness values are in this example used to obtain the respective thickness values that make up the line 308. For example, when a match is found in the database, one or more of the corresponding property values associated therewith can be retrieved.

Figure 4:
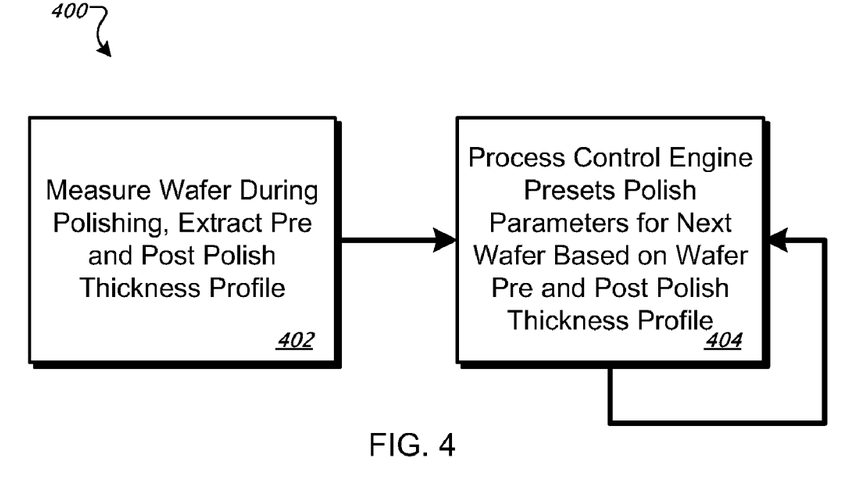
FIG. 4 is a flow chart of an example process for polishing a substrate to a particular thickness.

FIG. 4 shows an example process 400 for polishing a substrate using a database of spectra and physical property values. Process 400 measures (402) a wafer during polishing. In addition, process 400 extracts pre and post polish thickness profiles. For example, the thickness profiles may be derived from spectra recorded at the beginning and end of the polishing. A process control engine presets (404) polish parameters for a next wafer based on the pre and post polish profiles of the first wafer. The process control engine may preset (404) the polish parameters again for one or more wafers based on the pre and post thickness profiles of the first wafer. Thus, polishing parameters for a next wafer to be polished can be set using profiles for a previously polished wafer.

Figure 5:
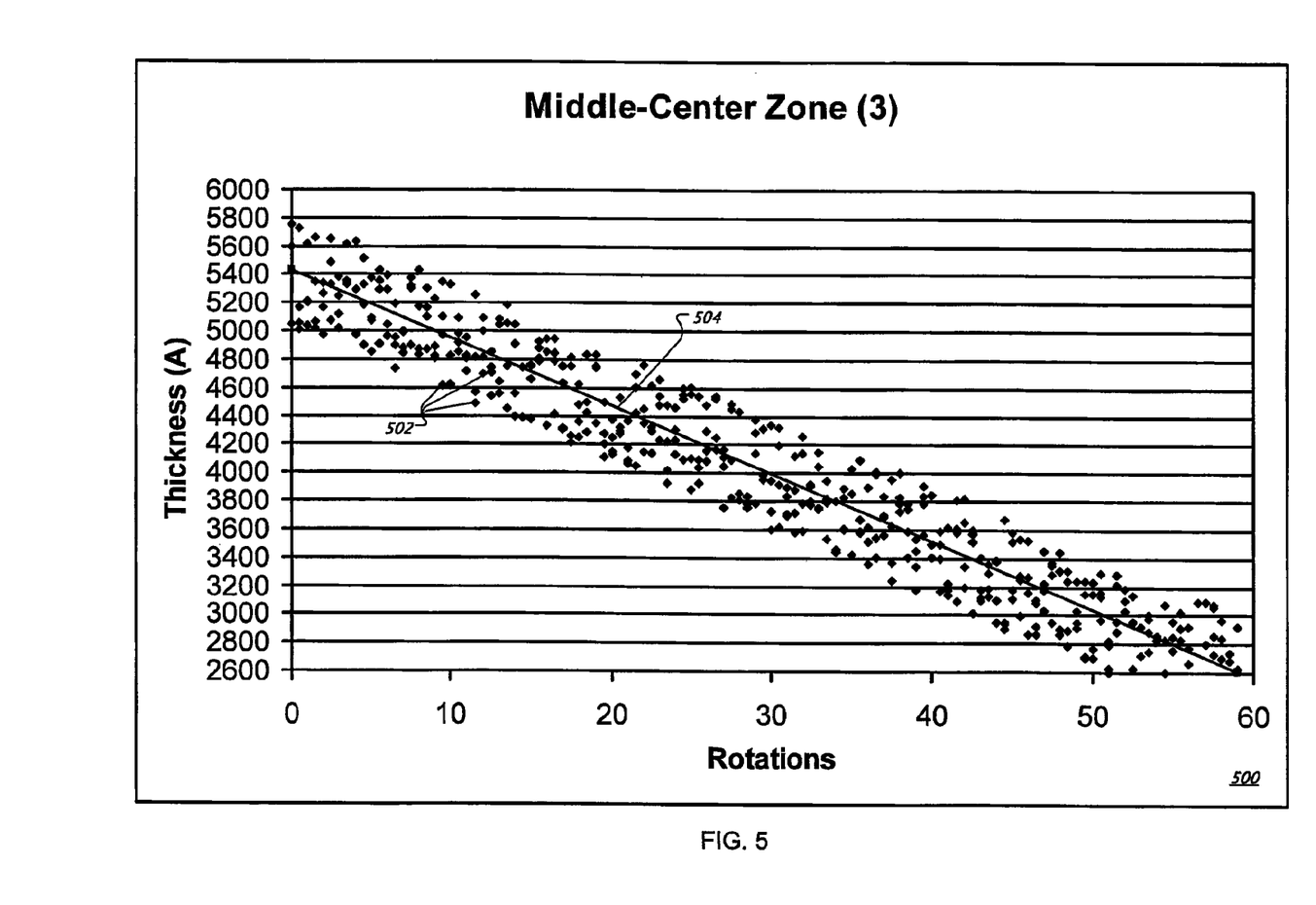
FIG. 5 is an example graph of thickness versus number of polishing rotations.

FIG. 5 shows an example graph 500 of thickness versus polishing rotations. The horizontal axis ranges from 0 to 60 rotations of a polishing machine that is operating on a substrate. Alternatively, the horizontal axis could be measured in units of time for the polishing process. The vertical axis represents the thickness of the substrate in Angstroms. Data points 502 represent measurements of the thickness taken at each rotation of the polishing machine for a particular location on the substrate, a middle-center zone. Particularly, there are several measurements in this zone for each rotation. An equation of a line 504 is determined based on the data points 502, such as a line determined by linear regression. In addition, a correlation factor or goodness of fit calculation is made to determine how well the determined line 504 represents the data points 502. The line 504 may be used, for example, to calculate thickness values for rotation values where spectra were not recorded.

The line 504 is of the form:

$$y=kx+c,$$

where y is the thickness, x is the number if rotations, k is a removal rate per rotation, and c is the initial thickness of the substrate. Thicknesses in the regions outside of the measured thicknesses may be interpolated using the equation above. For example, a thickness less than the smallest measured thickness, such as 2500, may be achieved with a number of polishing rotations greater than the largest measured rotation, such as 60.25. The number of rotations (i.e., 60.25) needed to reach a thickness of 2500 is determined using the equation of the line 504.

Each data point 502 corresponds to a measured spectrum. Thus data points 502 near the left side of the graph 500 correspond to a spectrum measured at the beginning of the polishing process, such as the spectrum 214, and data points 502 near the right side of the graph 500 correspond to a spectrum measured at the end of the polishing process, such as the spectrum 216. Thicknesses associated with previously recorded spectra stored in a database are retrieved. The thicknesses and their associated number of polishing rotations are shown here in the graph 500.

The equation above may also be used to determine the amount of wear on a polishing device (e.g., a polishing pad). As the polishing device begins to wear, the thickness determined begins to stray from the line 504 determined by the equation. Less material is removed as the polishing device wears down and the thickness determined by, for example, optical thickness metrology is greater than the thickness as calculated by the equation. This causes the slope of the line 504 (i.e., the polishing rate) to be reduced and the line 504 flattens out. Accordingly, monitoring this property during the process can give an indication of whether the process is progressing normally.

Figure 6:
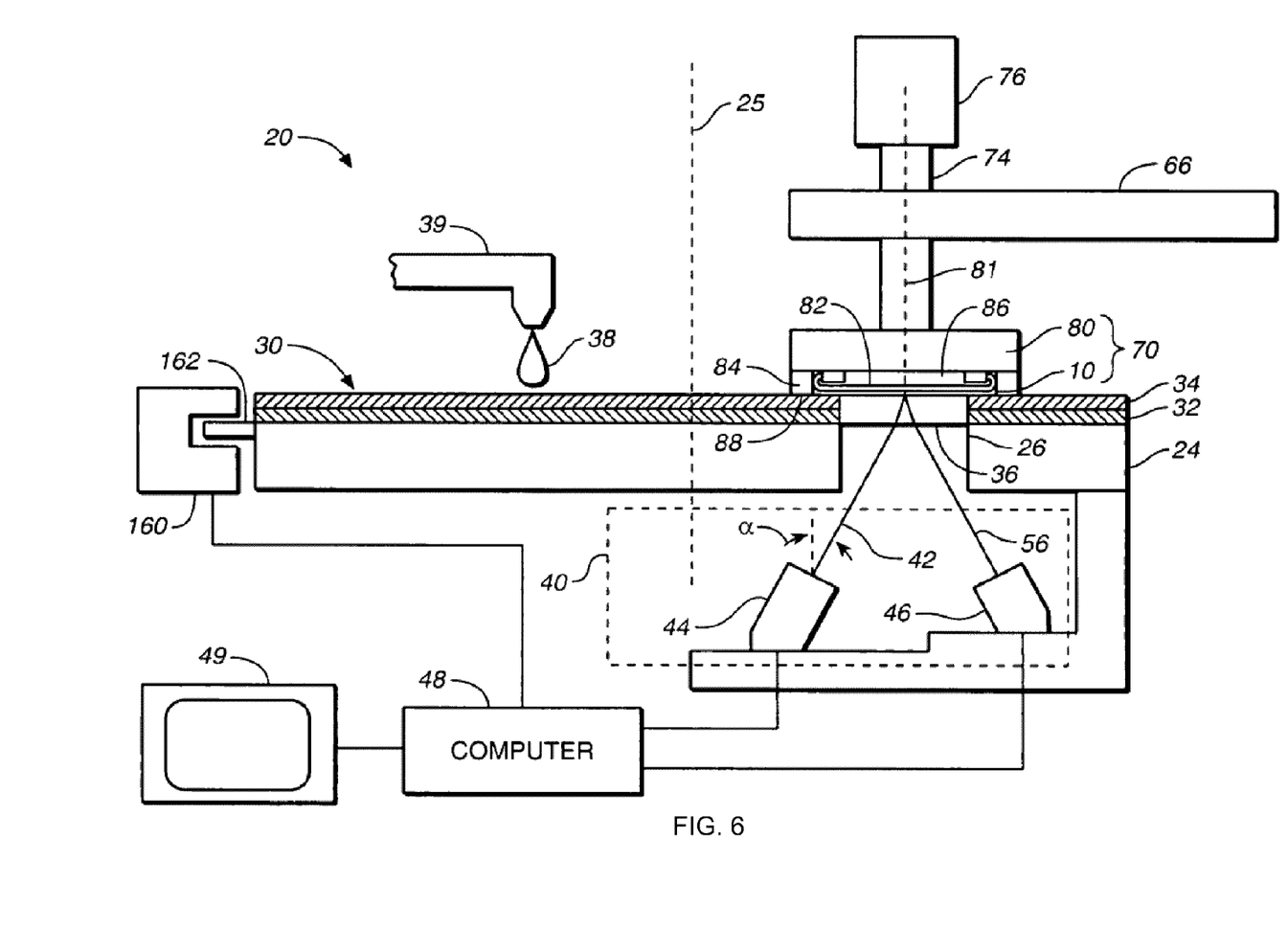
FIG. 6 is a block diagram of an example system that measures a physical characteristic of a patterned wafer.

Implementations described herein can be used with any type of procedure where one or more physical properties of a substrate are determined, and not only in connection with a polishing process, which has been mentioned above as an example. Nevertheless, as an illustration of a polishing process there will now be described how a polishing system can be configured and operated. FIG. 6 shows a chemical mechanical polishing (CMP) apparatus 20 in which one or more substrates 10 can be polished. For example, a Shallow Trench Isolation (STI) process could produce the substrate 10. The CMP apparatus includes a rotatable platen 24 on which is placed a polishing pad 30. This may be a two-layer polishing pad with a hard durable outer surface or a relatively soft pad. If substrate 10 is an "eight-inch" (200 millimeter) or "twelve-inch" (300 millimeter) diameter disk, then the platen and polishing pads will be about twenty inches or thirty inches in diameter, respectively. The platen 24 may be connected to a platen drive motor (not shown). For most polishing processes, the platen drive motor rotates platen 24 at thirty to two hundred revolutions per minute, although lower or higher rotational speeds may be used.

Polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 may be composed of an open cell foamed polyurethane or a sheet of polyurethane with a grooved surface. Backing layer 32 may be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

The CMP apparatus 20 may include one or more carrier head systems 70, optionally mounted on a rotatable multi-head carousel (not shown). The carrier head system is supported by a support plate 66. The carrier head system includes a carrier or carrier head 80. A carrier drive shaft 74 connects a carrier head rotation motor 76 to each carrier head 80 so that each carrier head can independently rotate about it own axis. In addition, each carrier head 80 independently laterally oscillates. For example, a slider (not shown) may support each drive shaft in its associated radial slot, and a radial drive motor (not shown) may move the slider to laterally oscillate the carrier head.

The carrier head 80 performs several mechanical functions. Generally, the carrier head holds the substrate against the polishing pad, evenly distributes a downward pressure across the back surface of the substrate, transfers torque from the drive shaft to the substrate, and ensures that the substrate does not slip out from beneath the carrier head during polishing operations.

Carrier head 80 may include a flexible membrane 82 that provides a mounting surface for substrate 10, and a retaining ring 84 to retain the substrate beneath the mounting surface. Pressurization of a chamber 86 defined by flexible membrane 82 forces the substrate against the polishing pad. Retaining ring 84 has a lower surface 88 which may reflect light.

A slurry 38 containing a reactive agent and a chemically-reactive catalyzer (e.g., potassium hydroxide for oxide polishing) may be supplied to the surface of polishing pad 30 by a slurry supply port or combined slurry/rinse arm 39. If polishing pad 30 is a standard pad, slurry 38 may also include abrasive particles (e.g., silicon dioxide for oxide polishing).

In operation, the platen is rotated about its central axis 25, and the carrier head is rotated about its central axis 81 and translated laterally across the surface of the polishing pad. A hole 26 is formed in platen 24 and a transparent window 36 is formed in a portion of polishing pad 30 overlying the hole. Hole 26 and transparent window 36 are positioned such that they have a view of substrate 10 during a portion of the platen's rotation, regardless of the translational position of the carrier head.

An optical system 40 is secured to platen 24 generally beneath hole 26 and rotates with the platen. The system includes the light source 44 and the detector 46. The light source generates a light beam 42 which propagates through transparent window 36 and slurry 38 to impinge upon the exposed surface of substrate 10. The light beam 42 is projected from light source 44 at an angle α from an axis normal to the surface of substrate 10, i.e., at an angle α from axes 25 and 81. In addition, if the hole 26 and window 36 are elongated, a beam expander (not illustrated) may be positioned in the path of the light beam to expand the light beam along the elongated axis of the window.

Light source 44 may operate continuously. Alternately, it may be activated to generate light beam 42 during a time when hole 26 is generally adjacent substrate 10. CMP apparatus 20 may include a position sensor 160, such as an optical interrupter, to sense when window 36 is near the substrate. For example, the optical interrupter could be mounted at a fixed point opposite carrier head 80. A flag 162 is attached to the periphery of the platen. The point of attachment and length of flag 162 is selected so that it interrupts the optical signal of sensor 160 from a time shortly before window 36 sweeps beneath carrier head 80 to a time shortly thereafter. The output signal from detector 46 may be measured and stored while the optical signal of sensor 160 is interrupted.

In operation, light source 44 may generate the light beam 42 to impinge on the substrate 10. The detector 46, in turn, receives a light beam 56 that is reflected off the substrate 10. The detector 46 may transmit corresponding information about the reflected light beam 56 to the computer 48. Information received or processed by the computer 48 may be output on the display device 49. For example, the computer determines an endpoint as described above. When the computer 48 determines that the endpoint of the CMP process has been reached, it can terminate the CMP by deactivating the CMP apparatus 20.

Figure 7:
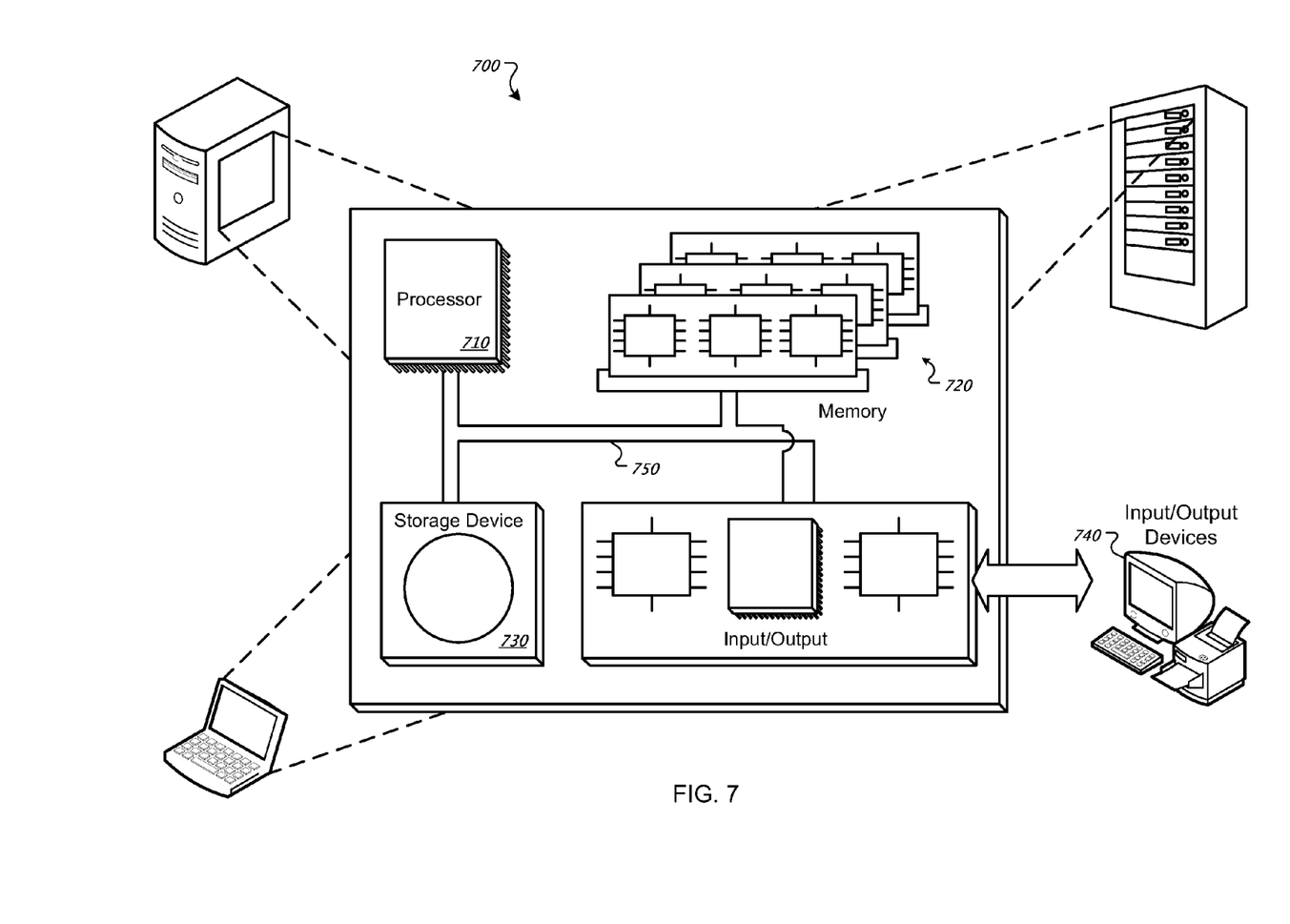
FIG. 7 is a schematic diagram of an example generic computer system.

FIG. 7 is a schematic diagram of an example of a generic computer system 700. The system 700 can be used for the operations described in association with the methods described herein. For example, the system 700 may be included in either or all of the system 100 and the apparatus 200.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

We claim:

1. A method of determining a polishing endpoint of a substrate, the method comprising:
    polishing a surface of a substrate;
    storing in a database a plurality of previously recorded spectra, each of the previously recorded spectra having a physical property value associated therewith stored in the database;
    during polishing, directing a beam of white light to impinge the surface of the substrate and generate a reflected light beam and measuring a sequence of first spectra of the reflected light beam;
    for each first spectrum from the first spectra, determining a second spectrum from the plurality of previously recorded spectra stored in the database that matches the first spectrum to generate a sequence of second spectra, wherein the second spectrum matches the first spectrum when the second spectrum is similar to the first spectrum;
    for each second spectrum in the sequence of second spectra, identifying from the database the physical property value stored in the database associated with the second spectrum to generate a sequence of physical property values; and
    determining a polishing endpoint from the sequence of physical property values.

2. The method of claim 1, wherein the physical property value is a value of a physical property selected from the group consisting of: a layer thickness on the substrate and a step height on the substrate.

3. The method of claim 2, wherein the physical property is the layer thickness on the substrate.

4. The method of claim 2, wherein the physical property is the step height on the substrate.

5. The method of claim 1, further comprising determining a linear function for the sequence of physical property values.

6. The method of claim 5, wherein determining the linear function comprises fitting the linear function to the sequence of physical property values.

7. The method of claim 6, further comprising determining the polishing endpoint from the linear function.

8. The method of claim 7, wherein determining the polishing endpoint from the linear function comprises calculating when the linear function reaches a target value.

9. The method of claim 5, further comprising calculating a resulting value of the physical property from the linear function.

10. The method of claim 9, wherein calculating includes extrapolation of the resulting value from the linear function.

11. A computer program product tangibly embodied in a computer-readable storage device, the computer program product including instructions that, when executed, cause a processor to perform operations comprising:
    polishing a surface of a substrate;
    storing in a database a plurality of previously recorded spectra, each of the previously recorded spectra having a physical property value associated therewith stored in the database;
    during polishing, directing a beam of white light to impinge the surface of the substrate and generate a reflected light beam and measuring a sequence of first spectra of the reflected light beam;
    for each first spectrum from the first spectra, determining a second spectrum from the plurality of previously recorded spectra stored in the database that matches the first spectrum to generate a sequence of second spectra, wherein the second spectrum matches the first spectrum when the second spectrum is similar to the first spectrum;

for each second spectrum in the sequence of second spectra, identifying from the database the physical property value stored in the database associated with the second spectrum to generate a sequence of physical property values; and determining a polishing endpoint from the sequence of physical property values.

12. The computer program product of claim 11, wherein the physical property value is a value of a physical property selected from the group consisting of: a layer thickness on the substrate and a step height on the substrate.

13. The computer program product of claim 12, wherein the physical property is the layer thickness on the substrate.

14. The computer program product of claim 12, wherein the physical property is the step height on the substrate.

15. The computer program product of claim 11, further comprising determining a linear function for the sequence of physical property values.

16. The computer program product of claim 15, wherein determining the linear function comprises fitting the linear function to the sequence of physical property values.

17. The computer program product of claim 16, further comprising determining the polishing endpoint from the linear function.

18. The computer program product of claim 17, wherein determining the polishing endpoint from the linear function comprises calculating when the linear function reaches a target value.

19. The computer program product of claim 15, further comprising calculating a resulting value of the physical property from the linear function.

20. The computer program product of claim 19, wherein calculating includes extrapolation of the resulting value from the linear function.

* * * * *